Dec. 7, 1965     C. W. DAMES, JR., ETAL     3,222,443
METHOD OF MOLDING LACTAMS IN A POLYSILOXANE MOLD
Filed Dec. 4, 1962
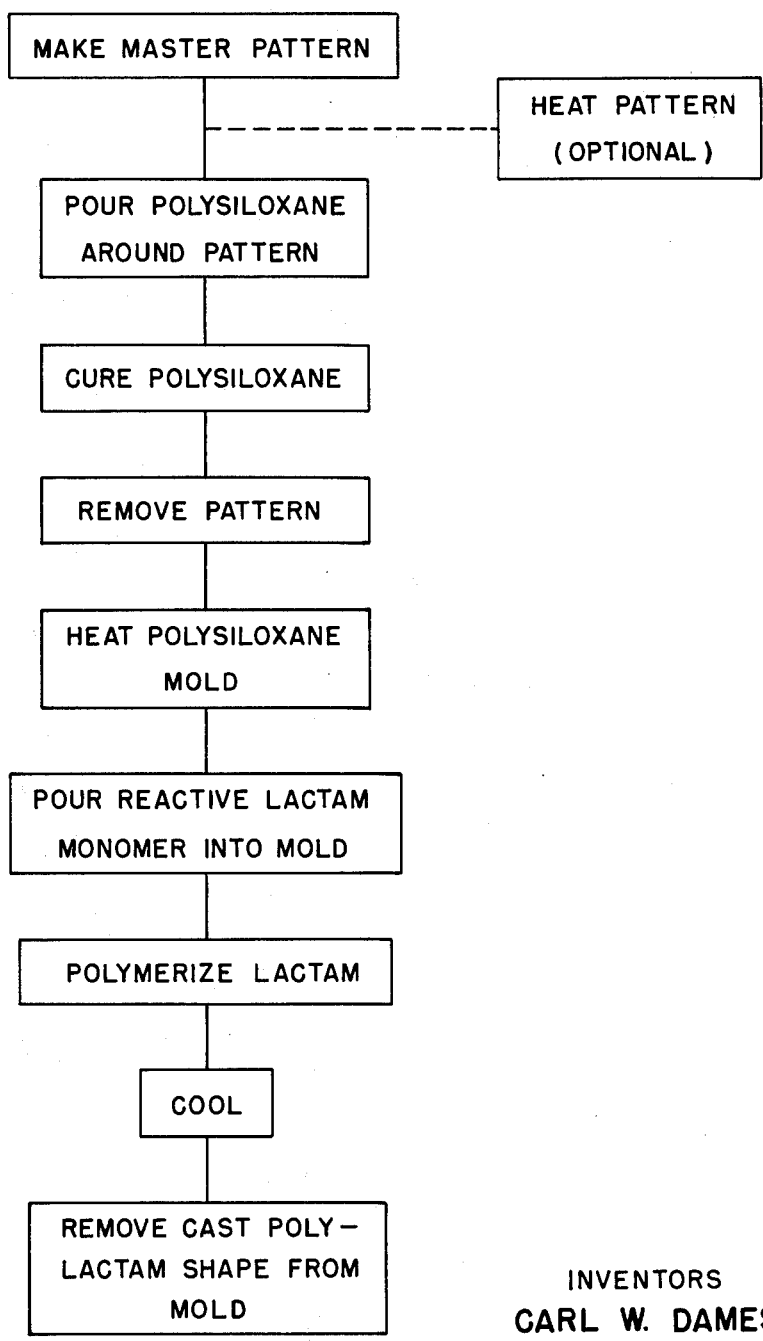
INVENTORS
CARL W. DAMES, JR.
RICHARD W. BOYER
BY *Richard O. Church*
ATTORNEY 3,222,443
METHOD OF MOLDING LACTAMS IN A
POLYSILOXANE MOLD
Carl W. Dames, Jr., Reading, and Richard W. Boyer, West
Lawn, Pa., assignors, by mesne assignments, to The
Polymer Corporation, a corporation of Pennsylvania
Filed Dec. 4, 1962, Ser. No. 242,111
22 Claims. (Cl. 264—313)

This invention relates to a method of making shaped polylactam articles. More particularly, this invention relates to a method of casting and in situ polymerization of higher lactams in a cured polysiloxane elastomeric mold to produce shaped polylactam or polyamide articles which are dimensionally accurate and in which surface fidelity is high.

Lactams, such as for example epsilon-caprolactam, may be polymerized by various known methods but the present invention encompasses only polymerization of higher lactams by low temperature anionic processes. As used herein, "low temperature polymerization" refers to polymerization processes that can, if desired, be carried out above the melting point of the monomer but below the melting point of the polymer. In this type of polymerization articles can be cast simultaneously with the polymerization. This can also be referred to as in situ polymerization or bulk polymerization.

The low temperature anionic polymerization of lactams referred to above is disclosed, for example, in U.S. Patents 3,015,652; 3,017,391; 3,017,392 and 3,018,273.

Briefly, the above patents disclosed the novel polymerization of higher lactams, i.e., lactams containing at least 6 carbon atoms in the lactam ring, as for example, ε-caprolactam, enantholactam, caprylolactam, decanolactam, undecanolactam, dodecanolactam, pentadecanolactam, hexadecanolactam, methylcyclohexanone isoximes, cyclic hexamethylene adipamide, and the like, and mixtures thereof; in the presence of an anionic polymerization catalyst, as for example, alkali and alkaline earth metals such as lithium, sodium, potassium, magnesium, calcium, strontium, etc., either in metallic form or in the form of hydrides, borohydrides, oxides, hydroxides, carbonates, etc., organo-metallic derivatives of the foregoing metals, as well as other metals, such as butyl lithium, ethyl potassium, propyl sodium, phenyl sodium, triphenylmethyl sodium, diphenyl magnesium, diethyl zinc, triisopropyl aluminum, diisobutyl aluminum hydride, sodium amide, magnesium amide, magnesium anilide, Grignard reagent compounds, such as ethyl magnesium chloride, methyl magnesium bromide, phenyl magnesium bromide, and the like; and a promoter compound such as organic isocyanates, ketenes, acid chlorides, acid anhydrides, and N-substituted imide having the structural formula A—N—B,
                                                         R
wherein A is an acyl radical such as carbonyl, thiocarbonyl, sulfonyl, phosphinyl and thiophosphinyl radicals, B is an acyl radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tert.-amino, acylamido, N-substituted carbamyl, N-substituted carbamido, alkoxy, ether groups and the like, A and B, or A and R, together can form a ring system through a divalent linking group, and any free valence bond of the A and B radicals can be hydrogen or R, excepting A directly linked thereto, and the promoter compound preferably has a molecular weight of less than about 1000.

This polymerization of the higher lactams is initiated at temperatures of from about the melting point of the lactam monomer to about 250° C., and preferably from about 125° to about 200° C. As the reaction is exothermic, the initiation temperature will be exceeded under most conditions. The amount of catalyst and promoter compound each can vary from about 0.01 to about 20 mole percent, preferably from about 0.05 to about 5 mole percent, and more preferably still from about 0.1 to about 1 mole percent, all based on the higher lactam being polymerized. The higher lactams preferably contain from 6 to 20 carbon atoms and more preferably contain from 6 to 12 carbon atoms. The anionic catalyst preferably is a Grignard compound or an alkali metal and hydrides thereof. It will be understood that the anionic catalyst can be reacted in stoichiometric amount with a higher lactam to form a salt thereof, such as sodium caprolactam, and said salt can then be employed in the polymerization process in an equivalent amount to the anionic catalyst as set out hereinabove. This preliminary preparation is particularly desirable as it permits ready removal of hydrogen gas from the system as when sodium or sodium hydride is employed, removal of water as when sodium hydroxide is employed, removal of water and carbon dioxide as when sodium carbonate is employed, etc. Isocyanates and N-substituted imides are the preferred promoter compounds. It will be understood that the use of acid chlorides effects the presence of HCl in the system which preferably is removed therefrom to preclude reaction with the anionic catalyst, whereby extra catalyst would otherwise be required. Similarly acid anhydrides generate organic acids in the system which then require sufficient anionic catalyst to neutralize the organic acid in addition to the amount desired to function in the polymerization reactions.

It is an object of this invention to produce shaped polylactam articles.

Another object of this invention is to provide a method of producing shaped polylactam articles which duplicate accurately the dimensions and surface features of a master or prototype.

A further object of this invention is to provide a method of producing shaped polylactam articles directly from a monomeric mixture and in which provision is made for easy removal of the shaped article from the mold.

These, and other objects which will become more apparent from the drawing and following description of the invention, are achieved by using a particular polysiloxane mold material. The drawing sets out the essential manipulative steps of making and using the polysiloxane mold according to the method of the invention. It is essential that the mold and mold forming material have the following properties:

I. The mold material must be able to withstand moderately high temperatures and be a resonably good conductor of heat. Thus, the mold material must be able to withstand temperatures in the range of about 300° F.–500° F., without any appreciable distortion, and for extended periods of time.

II. The mold material must be compatible and nonreactive with the polymerization system which, in the instance, comprises the higher lactam, catalyst, and promoter (alternatively referred to as initiator) compound. It must, further, be compatible at the initiation temperatures used and at the temperatures attained during formation of the article due to the exothermic polymerization reaction.

III. Desirably, the mold material should be flexible so as to facilitate removal of the part from the mold. It should also be an easily handled and comparatively nontoxic material.

IV. The mold forming material should be curable at relatively low temperatures, e.g., room temperature, and be usable with a wide variety of pattern or master materials. Additionally, the resultant mold should be reusable.

V. The mold material must be essentially non-porous (with respect to the polymerizable mix of monomer, catalyst and promoter) and have the ability to reproduce surface features with a high degree of fidelity.

VI. In order to produce articles which dimensionally are a true replica of a master, pattern or prototype, the mold material should desirably have the ability, under predetermined conditions, to compensate, at least in substantial part, for polymerization shrinkage.

Many synthetic, organic, curable materials have been tried in order to meet the above mold material requirements and have been found deficient in one or more respects. For example, polysulfide rubber had poor temperature resistance and was reactive with the polymerization system; natural rubber and many synthetic rubbers were highly reactive with or otherwise poisoned the polymerization system; many room temperature curing siloxane elastomers such as those disclosed in U.S. Patent 2,571,039 were reactive with or poisoned the polymerization system, most probably because the siloxan polymers of this patent contains acid groups such as sulphate and phosphate groups; plastisols were tried and rejected because of poor temperature resistance.

A material, suitable for the making of molds, which has been found eminently suitable for in situ, anionic polymerization of higher lactams, is a room temperature curing siloxane elastomer of the type disclosed in U.S. Patent 2,927,907, the disclosure of which is incorporated herein by reference.

These siloxane curing materials are based on "acid free" siloxane polymers which term is taken to mean polymers free of acid groups such as $\equiv SiAc$, where Ac is, for example, Cl, $-OSO_3H$, $-OPO_3H_2$, or $-OPO_3Et$.

In preparing a mold for use in the present invention, a room temperature curing composition of matter is used which consists essentially of (1) an organopolysiloxane of at least 100 cs. viscosity at 25° C., said siloxane being composed of polymer units of the formula

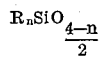

where R is of the group monovalent hydrocarbon radicals and halogenated monovalent hydrocarbon radicals and $n$ has an average value from 1.99 to 2 inclusive, (2) from .1 to 50% by weight based on the weight of the siloxane of a hydrocarbonxy silicate in which the hydrocarbon radicals are monovalent aliphatic hydrocarbon radicals of less than 8 carbon atoms, and (3) from .01 to 10% by weight based on the weight of the polysiloxane of a carboxylic acid salt of metals ranging from lead to manganese inclusive in the electromotive series of metals, in which salt the acid radicals have less than 16 carbon atoms. Desirably, the room temperature curing composition contains a fourth ingredient, namely, a silica filler. Preferably, the polymeric siloxanes range in viscosity from 2000 cs., upwards, and more preferably, from 10,000 cs., upwards. Preferred mold materials useful in the present invention are the composition of Example 7 of the aforesaid U.S. Patent 2,927,907, although compositions of the other examples and disclosure may also be used. In the above definition of the curable compositions of matter, the carboxylic acid salt is the curing catalyst and is typically added to a mixture of the siloxane polymer, filler and silicate just prior to use.

EXAMPLE 1

A polysiloxane room temperature curing composition having a viscosity of 30,000 centipoises (cs.) and a specific gravity of 1.29 (@77° F.) before catalyzing and curing, was poured about a block form or master and allowed to cure for approximately 24 hours at room temperature whereupon the material set to a rubbery solid having a durometer hardness, Shore A scale, of about 40-42. After removing the master from the mold, the mold was ready for use.

A polymerizable mix of epsilon-caprolactam monomer, containing 1/200 of a mole of tolylene diisocyanate promoter (initiator) per mole of monomer, and 1/320 of a mole of sodium hydride catalyst per mole of monomer (used in its salt or concentrate form, i.e., as sodium caprolactam) was prepared and heated to an initiation temperature of 150° C. This polymerizable mix was then poured into the cured polysiloxane mold, as prepared above, which had been preheated to a predetermined temperature, in this instance 350° F. The filled mold was then placed in an oven maintained at a temperature of 350° F. for 10 minutes and then the finished polymerized article was removed from the mold, cooled and examined. Color, finish and detail were excellent and the linear dimensions were within 1 to 1½% of the master or prototype.

EXAMPLE 2

The procedure of Example 1 was repeated except that before pouring the polymerizable mix of epsilon-caprolactam, sodium catalyst, and tolylene diisocyanate, into the cured polysiloxane mold, the viscosity of the polymerizable mix was permitted to rise appreciably. This produced an article with a surface which was very smooth and free of bubbles and voids. As more fully disclosed and claimed in copending application of Richard W. Boyer, Serial No. 226,688, filed September 27, 1962, now patent 3,121,768, permitting the viscosity to rise by allowing the polymerizable mix to pass through an incipient polymer formation stage and pouring before it reaches a magnitude of viscosity which precludes pouring and filling of the mold cavity produces articles which have surfaces free of bubbles and voids. Such appreciable viscosity rise is accompanied by a temperature rise of at least about 3° to 5° C., as measured under essentially adiabatic conditions. This technique, which is taught in the aforementioned copending application to be useful with many molds and mold materials, is particularly useful with the cured polysiloxane molds used in the present invention.

EXAMPLE 3

A timing screw cured polysiloxane mold was made by pouring, about a wood pattern or master, a curable composition comprised of 100 parts of a dimethyl polysiloxane fluid of about 15,000 cs. viscosity which was essentially free of trimethyl-siloxy endblocks, 30 parts by weight diatomaceous earth, 0.5 part lead 2-ethylhexoate and 1.5 parts of allylorthosilicate, and then curing for about 24 hours at room temperature.

The wood pattern was removed from the mold and a removable core piece positioned in the center of the mold. A polymerizable mix of epsilon-caprolactam, containing 1/200 molar quantity of lithium hydride (used in its salt or concentrate form, i.e., as lithium caprolactam) and 1/200 molar quantity of tolylene diisocyanate was heated to 140° C. and poured in the cured polysiloxane mold which had been preheated to 375° F. The filled mold was placed in an oven, maintained at 350° F., and left there for about 2 hours. After removing the mold from the oven, the timing screw was removed from the mold by unscrewing. The inherent flexibility and elasticity of the mold also helped in removal of the part. The core piece was then removed from the part. Examination of the finished part showed good surface detail and linear dimensions were within about 1% of the pattern.

EXAMPLE 4

The procedure of Example 3 was repeated except that sodium acetyl caprolactam was used as the promoter compound in place of the tolylene diisocyanate. The finished part had excellent surface finish and detail and linear dimensions were very close to the pattern. In view of the fact that the pattern was initially made slightly oversize, dimensions of the finished article were within extremely small tolerances of the dimensions desired for the finished article.

Many different utilitarian articles can be made in the practice of this invention. For example, stock shapes such as rod, bar, plate, sheet; complex shapes such as gears, timing screws, fan blades, roll covers, spheres, drive bushings, etc.

One of the great advantages of using the cured polysiloxane mold in the present invention is its flexibility. This permits easy removal of the part from the mold, even with moderate undercut and drafts. Of course, if undercuts are severe, or if the configuration of the part otherwise desired requires it, split or multi-part molds of the polysiloxane composition may be formed. The molds may also employ cores made from the polysiloxane mold material or of dissimilar material. Molds may also be used which provide for making a composite article as where the lactam polymerizable mix is poured about a gear shaft, a metal roll, etc.

In another aspect of the invention, it is particularly pointed out that upon polymerization of the lactam polymerizable mix the article shrinks. Such shrinkage is herein termed polymerization shrinkage and is that shrinkage which occurs upon polymerization and solidification of the article including crystallite and/or spherulite formation as well as thermal shrinkage occurring upon cooling of the article to room temperature from the maximum temperature reached during the exothermic polymerization reaction. Polymerization shrinkage varies, volumetrically, from about 10% to about 20%, and about 3–5% linearally, depending upon the particular selection of monomer, catalyst and promoter compound. As an example, when using epsilion-caprolactam with 1/200 mole of sodium catalyst and 1/200 mole of tolylene diisocyanate promoter, and initiating polymerization at 160° C., the polymerization temperature reaches about 190° C., and polymerization shrinkage as hereinabove defined is about 18–20% (volumetric).

It is a feature of the present invention that by preheating the cured polysiloxane mold to temperatures approximately the same as the range of temperatures at which polymerization is initiated and/or carried out, polymerization shrinkage can be compensated for, at least in substantial part, since the thermal expansion of the cured polysiloxane mold material, when heated to this range of temperatures, substantially matches the polymerization shrinkage of the articles being produced. As heretofore stated, the polymerization of higher lactams is initiated at temperatures of from about the melting point of the lactam monomer to about 250° C., and preferably from about 125° C. to about 200° C. Thus, the mold is also preheated to temperatures within the above range.

In the manufacture of articles, for example a machine part, requiring an extremely small tolerance, it may be desirable to make the mold slightly oversize. This may be done by deliberately making the master or prototype slightly oversize. In another aspect of the invention, it is sometimes desirable to preheat the prototype or pattern to cause thermal expansion thereof, and then pour the polysiloxane curable mold forming composition thereabout at room temperature or even while the polysiloxane mold forming composition is maintained lower than room temperature and set the same while it is cool and the pattern or prototype is hot. In this manner, a polysiloxane mold is formed which is already slightly oversized.

The curable polysiloxane mold forming composition may also be used in combination with a non-flexible backing, for example, by coating wood, plaster, metal, etc., to produce a mold having a non-flexible backing and a flexible surface.

As will be apparent to those skilled in the art, many modifications, changes and alterations are possible without departing from the spirit and scope of this invention.

What is claimed is:

1. A process for forming a shaped polylactam article comprising the steps of charging a higher lactam containing at least 6 carbon atoms in the lactam ring into a cured polysiloxane elastomeric mold obtained from acid-free siloxane polymers, and polymerizing said lactam in situ in said polysiloxane mold under substantially anhydrous conditions.

2. The process of claim 1, wherein the lactam is epsilon-caprolactam.

3. The process of claim 1, in which the mold is charged only after the lactam has passed through an incipient polymer formation stage.

4. The process of claim 2 wherein the cured mold is heated to a temperature in a range from above the melting point of the lactam monomer to about 250° C.

5. The process of claim 4 in which the temperature range is between 125–200° C.

6. A process for forming a shaped polylactam article comprising the steps of charging a higher lactam containing at least 6 carbon atoms in the lactam ring into a cured polysiloxane elastomeric mold having a durometer hardness, Shore A scale of about 40–42, and polymerizing said lactam in situ in said polysiloxane mold under substantially anhydrous conditions.

7. A process for forming a shaped polylactam article comprising the steps of charging a cured polysiloxane elastomeric mold with a higher lactam containing at least 6 carbon atoms in the lactam ring, said cured polysiloxane mold being obtained from a mixture of ingredients consisting essentially of (1) a methyl polysiloxane having an average of from 1.99 to 2 inclusive methyl radicals per silicon atom, (2) from .1 to 50% by weight based on the weight of the siloxane of a hydrocarbonoxy silicate in which the hydrocarbon radicals are monovalent aliphatic hydrocarbon radicals of less than 8 carbon atoms, and (3) from .01 to 10% by weight based on the weight of the siloxane of a carboxylic acid salt of metals of the group consisting of lead, tin and iron, in which salt the acid radicals have less than 16 carbon atoms; and polymerizing said lactam in situ in said polysiloxane mold under substantially anhydrous conditions.

8. A process according to claim 7 in which said mold is heated from above the melting point of the lactam to a temperature below about 250° C. before charging said mold.

9. A process for forming a shaped polylactam article comprising the steps of charging a cured polysiloxane elastomeric mold with a higher lactam containing at least 6 carbon atoms in the lactam ring, said cured polysiloxane mold being obtained from a mixture of ingredients consisting essentially of (1) an organopolysiloxane of at least 100 cs. viscosity at 25° C., said siloxane being composed of polymer units of the formula $$R_n SiO_{\frac{4-n}{2}}$$

where R is selected from the group consisting of monovalent hydrocarbon radicals and halogenated monovalent hydrocarbon radicals and $n$ has an average value from 1.99 to 2 inclusive, (2) from .1 to 50% by weight based on the weight of the siloxane of a hydrocarbonoxy silicate in which the hydrocarbon radicals are monovalent hydrocarbon radicals of less than 8 carbon atoms, and (3) from .01 to 10% by weight based on the weight of the polysiloxane of a carboxylic acid salt of metals ranging from lead to manganese inclusive in the electromotive series of metals, in which salt the acid radicals have less than 16 carbon atoms, and (4) a silica filler; and polymerizing said lactam in situ in said polysiloxane mold under substantially anhydrous conditions.

10. A process according to claim 9 in which said mold is heated from about the melting point of the lactam to a temperature below about 250° C. before charging said mold.

11. A process for forming shaped polylactam articles which comprises first forming a mold by pouring a room temperature curable acid-free organopolysiloxane of at least 100 cs. viscosity measured at 25° C. about a master or prototype, curing said organopolysiloxane to an elastomeric product, removing said master or prototype from the cured polysiloxane mold and polymerizing a higher lactam containing at least 6 carbon atoms in the lactam ring in situ in said mold to form said shaped article.

12. The process of claim 11 in which the organopolysiloxane is cured approximately at room temperature.

13. The process of claim 11, in which the master or prototype is slightly oversize.

14. The process of claim 11 in which the master or prototype is made slightly oversize by preheating thereof prior to setting of the curable organopolysiloxane.

15. A process according to claim 14 in which said mold is heated from about the melting point of the lactam to a temperature below about 250° C. before charging said mold.

16. In the process of forming shaped polylactam articles by low temperature anionic polymerization of higher lactams containing at least 6 carbon atoms in the lactam ring, the improvement which comprises preheating a cured polysiloxane mold to a temperature sufficient to compensate, at least in part, for polymerization shrinkage of the higher lactam, and polymerizing the lactam in situ in said cured polysiloxane mold.

17. The process of claim 16 in which the lactam is epsilon-caprolactam and polymerization is carried out in the presence of an anionic polymerization catalysts and a N,N-diacyl tertiary nitrogen promoter compound.

18. The process of claim 16 in which the catalyst is sodium caprolactam and the promoter compound is tolylene diisocyanate.

19. The process of claim 16 in which polymerization of the higher lactam is initiated at a temperature above the melting point of the lactam monomer but below the melting point of the polymer.

20. The process of claim 16 in which the maximum polymerization temperature reached is below the melting point of the polymer and the polysiloxane mold is heated during the polymerization of said lactam.

21. The process of claim 16 in which the cured polysiloxane mold is obtained from acid-free siloxane polymers.

22. A process for forming a shaped polylactam article comprising the steps of charging a mold having a nonflexible backing and a molding surface comprising a cured polysiloxane elastomer with a higher lactam and polymerizing said lactam containing at least 6 carbon atoms in the lactam ring in situ in said mold under subtantially anhydrous conditions.

References Cited by the Examiner
UNITED STATES PATENTS

| | | | |
|---|---|---|---|
| 2,271,454 | 1/1942 | Erdle et al. | 264—313 |
| 3,066,351 | 12/1962 | Schriner | 264—313 |
| 3,121,768 | 2/1964 | Boyer | 264—331 |

ROBERT F. WHITE, *Primary Examiner.*

ALEXANDER H. BRODMERKEL, *Examiner.*